United States Patent [19]

Dannels et al.

[11] 4,260,359

[45] Apr. 7, 1981

[54] APPARATUS FOR RUNNERLESS INJECTION MOLDING THERMOSETTING MATERIALS

[75] Inventors: W. Andrew Dannels, Grand Island, N.Y.; Robert W. Bainbridge, Gainesville, Ga.

[73] Assignee: Hooker Chemicals & Plastics Corp., Niagara Falls, N.Y.

[21] Appl. No.: 972,181

[22] Filed: Dec. 21, 1978

[51] Int. Cl.³ .......................... B29F 1/03; B29F 1/05; B29F 1/08
[52] U.S. Cl. .............................. 425/543; 425/548; 425/549; 425/552; 425/563; 425/564; 425/568; 425/572
[58] Field of Search ............... 425/549, 562, 564, 568, 425/543, 552, 563, 572

[56] References Cited

U.S. PATENT DOCUMENTS

| | | | |
|---|---|---|---|
| 3,797,984 | 3/1974 | Yago | 425/549 X |
| 4,017,242 | 4/1977 | Mercer | 425/549 X |

FOREIGN PATENT DOCUMENTS

| | | | |
|---|---|---|---|
| 4618627 | 5/1971 | Japan | 425/568 |
| 514728 | 12/1971 | Switzerland . | |
| 2014080 | 8/1979 | United Kingdom . | |

OTHER PUBLICATIONS

SPE Journal, vol. 27, No. 9, Sep. 1971, pp. 30-32.

Primary Examiner—Thomas P. Pavelko
Attorney, Agent, or Firm—Peter F. Casella; James F. Mudd; David A. Stein

[57] ABSTRACT

An improved nozzle feed assembly is described. The assembly includes temperature-controlled member, preferably cylindrical in shape, having a closed end and an open end. The open end is fitted with standard threads to facilitate attachment of the nozzle member to the feed barrel of a conventional screw-type molding machine. The nozzle member has an internal temperature controlling means and a plurality of feed outlets positioned on the periphery of the nozzle member near the closed end. The temperature maintained in the nozzle member is sufficiently high to maintain the thermosetting molding material within the nozzle member in a plasticized state and sufficiently low that no substantial curing of the thermosetting molding material takes place. In an alternate mode, the assembly includes a sleeve member positioned around the periphery of the nozzle member and moveable to cover and uncover the feed outlets in the periphery of the nozzle member. In such alternate mode, means are provided to move the sleeve member from a position wherein the feed outlets are covered when the mold faces are open to a position wherein the feed outlets are uncovered when the mold faces are closed.

10 Claims, 5 Drawing Figures

APPARATUS FOR RUNNERLESS INJECTION MOLDING THERMOSETTING MATERIALS

The present application is related to U.S. Application Ser. No. 972,182 filed of even date herewith, and now abandoned, entitled "Apparatus for Runnerless Injection—Compression Molding Thermosetting Materials".

The present invention relates to an improved apparatus for molding thermosetting materials and, more particularly, to the molding of thermosetting synthetic resin compositions.

Injection molding is an advantageous method of forming articles of synthetic resin. In general terms, injection molding is a process wherein the molding composition, in a melted or plasticized state, is injected into a mold cavity. Typically, cold molding composition in granular form is fed from a hopper into a heated cylinder containing a screw. The molding composition is heated, melted and plasticized on the screw flights, and then the screw, acting as a ram, injects the melted and plasticized material into a mold cavity. In the case of thermosetting material, the molded material is cured in the mold by compaction and by heat added to the mold cavity. After curing, the article is ejected from the mold and the process repeated.

Injection molding offers the advantages of reduced molding cycles, better control of process variables, and increased productivity as compared with conventional compression and transfer molding processes. The major disadvantage with the injection molding of thermosetting materials is the generation of a considerable amount of waste material, particularly when multiple cavity systems are employed. The waste material is generated by thermosetting material that has cured, become infusible, in the runner and sprue systems and cannot be reused. The amount of non-reusable waste material generated in this fashion can be substantial, ranging typically from about 15 to about 80 percent of the total amount of material required to mold an article.

A more recent technical advance in the molding art has been the adaptation of the runnerless injection, or cold manifold, process to the injection molding of thermosetting resins. In the cold manifold process, the material in the sprue and manifold system is maintained at a temperature sufficient to maintain the material in a plasticized condition, without causing the material to prematurely cure or "set-up". Thus, when a cured part is removed from the mold cavity, the material in the sprue and manifold becomes part of the next molding, instead of being discarded as in conventional injection molding operations. The runnerless injection process, therefore, provides for significant savings in material.

The thermosetting materials usually employed in runnerless injection processes differ in some respects from materials normally employed in conventional injection processes because of the different requirements of each process. One significant difference is that a standard injection molding material typically has a stiffer plasticity for faster molding cycles. In contrast, a runnerless injection material is adapted to remain in a plasticized or fused condition in the feed system for extended periods of time without prematurely curing, usually at temperatures between about 104° and about 116° C. (220° to 240° F.), while also being capable of rapidly curing in the mold cavity at the molding temperature, usually about 170° C. (340° F.). Examples of suitable runnerless injection molding compositions are described in U.S. Ser. No. 915,335 filed June 13, 1978, entitled "Phenolic Resins With Improved Low Temperature Processing Stability". The disclosure in the referenced application is hereby incorporated herein by reference. Although such formulations are useful in the present invention, they are not required, and the molding compositions presently utilized may be selected from the more economical and more readily available standard thermosetting compositions.

Thermosetting molding materials useful in the present invention may suitably be selected from thermosetting synthetic resins and resin compositions typically used in molding operations, for example, phenolic; amino, such as urea, melamine and melamine/phenolic; polyester resins in granular, nodular, bulk or sheet forms; alkyd; epoxy; silicone; diallylphthlate; polyamides; or from thermosetting natural and synthetic rubber compositions. Phenolic resin compositions are especially useful as the feed material. Phenolic resin compositions used in molding operations are usually employed in the form of molding compositions. Phenolic molding compositions typically are particulate in form containing a molding grade phenolic resin, a cross-linking agent, such as hexamethylenetetramine and suitable filler materials.

The present apparatus is particularly adapted to use in molding operations involving the use of a plurality of molds fed simultaneously from a single feed nozzle.

Conventional reciprocating screw-type molding machines have a feed unit comprised of a nozzle member mounted on the front of a heated barrel. A reciprocal and rotatable screw is positioned within the barrel. The rotating motion of the screw plasticizes a thermosetting molding material within the barrel. Subsequently, a reciprocating motion of the screw, acting as a ram, feeds the plasticized molding material through the nozzle member, through a runner system, into a closed mold. The mold is heated to a temperature sufficiently high to cure the molding material.

GENERAL DESCRIPTION OF THE INVENTION

The present invention provides an improved nozzle feed assembly. The assembly is comprised of a nozzle member, preferably cylindrical in shape, having a closed end and an open end. The open end is preferably fitted with standard threads to facilitate attachment of the nozzle member to the feed barrel of a conventional screw-type molding machine. The nozzle member has a temperature controlling means disposed therein and a plurality of feed outlets positioned along the periphery of the nozzle member near the closed end. The temperature maintained in the nozzle member is sufficiently high to maintain the thermosetting molding material within the nozzle member in a plasticized state and sufficiently low that no substantial curing or setting up of the thermosetting molding material takes place. By substantial curing or setting up of the thermosetting molding material is meant the amount of premature polymerization which would adversely inhibit the plasticity or mobility of the molding material. In an alternate mode, the assembly includes a sleeve member snugly positioned around the periphery of the nozzle member and movable to cover and uncover the feed outlets in the periphery of the nozzle member. In such alternate mode, means are provided to move the sleeve member from a position wherein the feed outlets are covered when the mold faces are open to a position wherein the feed outlets are uncovered when the mold faces are closed.

DETAILED DESCRIPTION OF THE INVENTION

The present invention will be illustrated and described in greater detail by reference to the attached drawings.

As shown in FIG. 2, the mold faces are closed, and the feed outlets in the nozzle member allow thermosetting molding material to flow from the nozzle member into the mold cavity.

Figure 4:
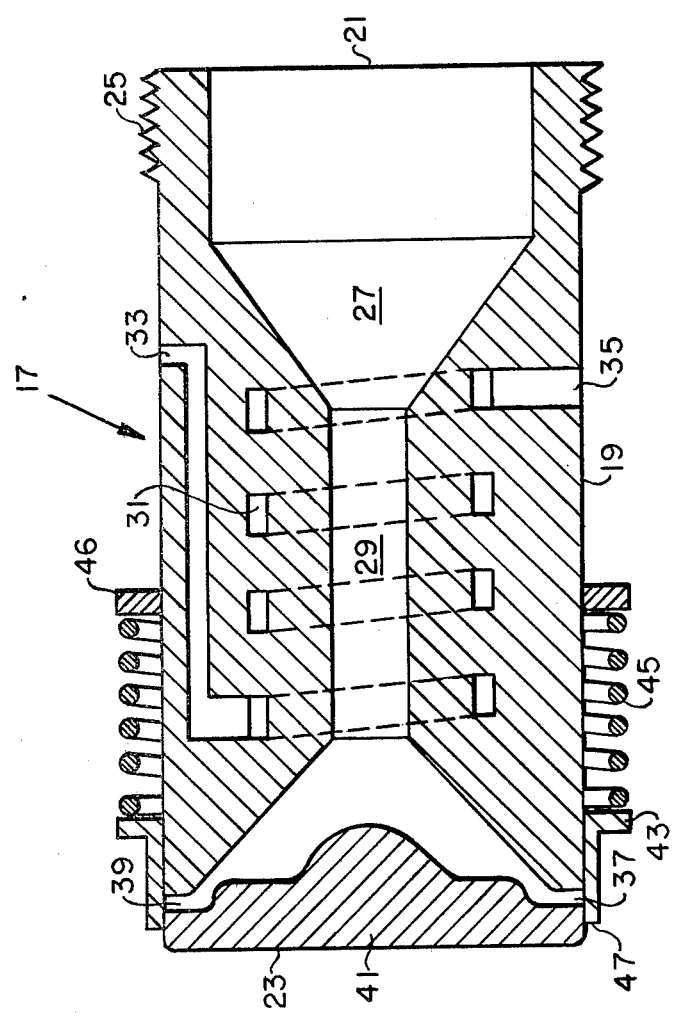

FIG. 4 is an axial cross-sectional view of an alternate embodiment of the present invention wherein the feed nozzle assembly includes a sleeve member movable along the periphery of the nozzle member to open or close the feed outlets on the nozzle member. As shown in FIG. 4, the assembly is in a closed position. This embodiment is particularly useful if drool, or oozing of molding material, becomes a problem when the mold faces are in an open position.

Figure 5:
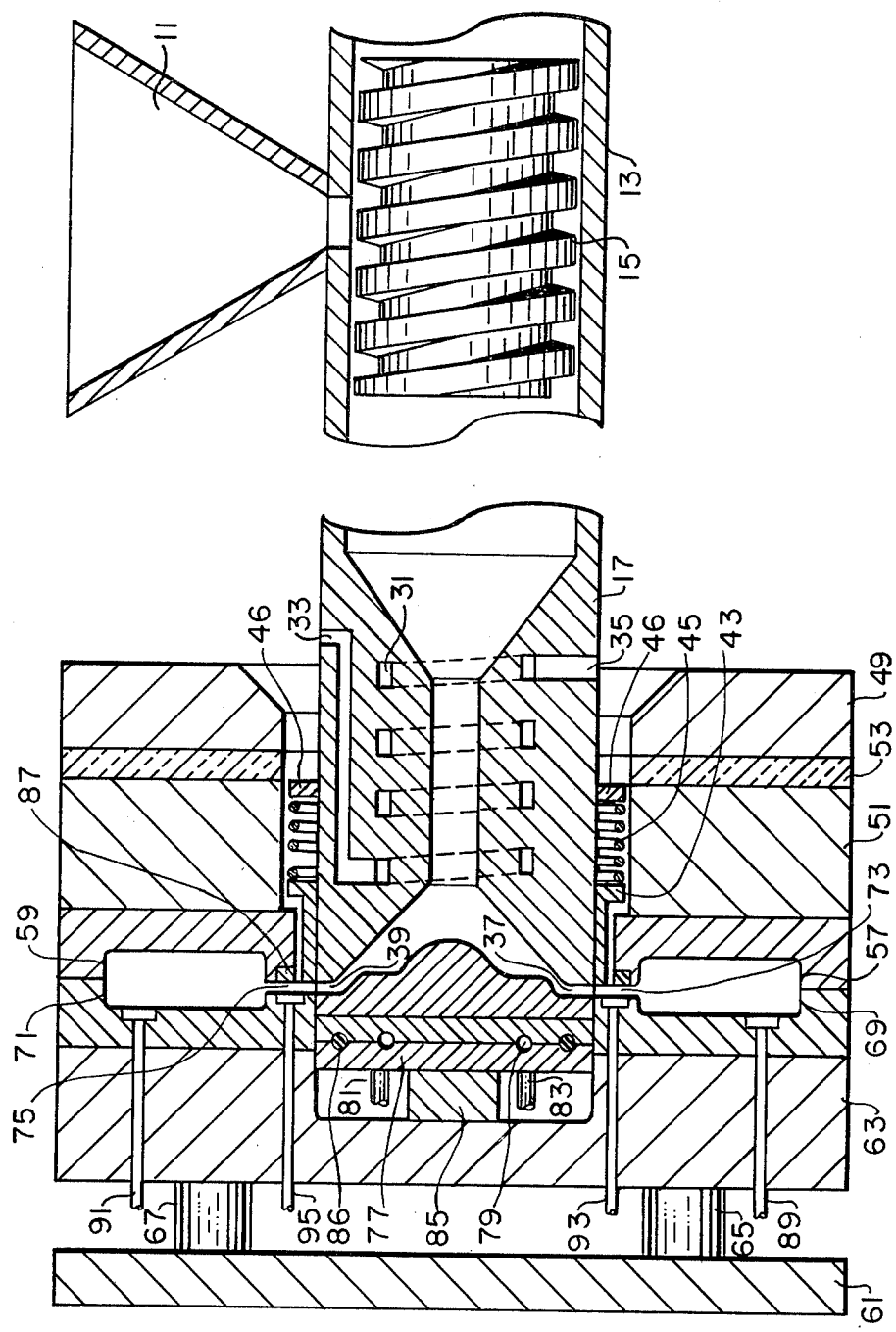

FIG. 5 is a sectional view, partly schematic, showing a screw-type injection molding apparatus equipped with a feed nozzle assembly such as that shown in FIG. 4. As shown in FIG. 5, the mold faces are in a closed position.

Figure 1:
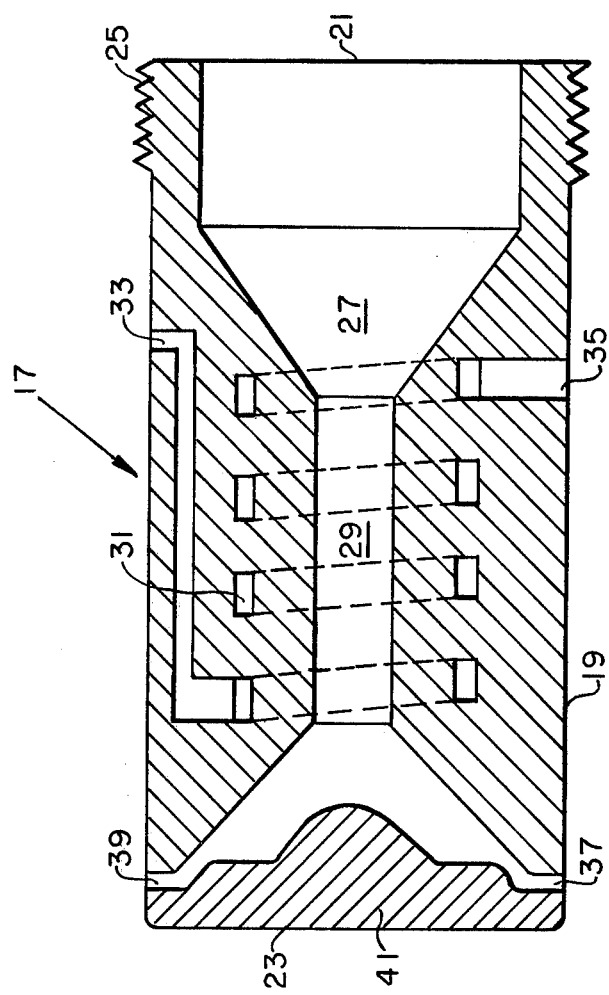
FIG. 1 is an axial cross-sectional view of the feed nozzle assembly of the present invention.

Looking now at FIG. 1, the nozzle assembly comprises nozzle member 17 having housing 19, preferably cylindrical in shape, having open end 21 and closed end 23. The open end is adapted to be connected to the feed barrel of a conventional screw-type molding machine, suitably by thread means 25. Nozzle member 17 has an internal chamber 27 formed by closed end 23 and the interior face of housing 19. Internal chamber 27 has a constricted chamber portion, or zone, 29 formed by a narrowing of a portion of the internal wall of housing 19 intermediate the open end 21 and closed end 23. Nozzle member 17 is equipped with a temperature controlling means comprised of a channel or channels forming reservoir 31. Preferably, reservoir 31 encircles constricted zone 29 and has an inlet 33 and an outlet 35 for circulating a liquid, suitably water, at the desired temperature, through reservoir 31. The fluid maintains a temperature in the nozzle member which is sufficiently high to maintain thermosetting molding material within the nozzle in a plasticized state and sufficiently low that no substantial curing of the molding material occurs. Usually, temperatures between about 77° and about 121° C. (170° to 250° F.) and, within that range, temperatures between about 99° and about 116° C. (210° to 240° F.) are useful for a wide variety of thermosetting molding materials.

Nozzle member 17 has a plurality of feed outlets, or orifices, such as 37 and 39, positioned around the periphery thereof connected with internal chamber 27. Each feed outlet is adapted to be aligned with a runner channel, to feed thermosetting molding material from nozzle member 17 into a mold cavity. Preferably, nozzle member 17 has a feed distribution means comprised of flattened conical member 41 suitably threadably affixed to the interior of closed end 23 of housing 19. Thermosetting feed material passes over flattened conical member 41 and is directed axially outward in an even flow through outlets, such as 37 and 39, which are preferably positioned around the periphery of flattened conical member 41.

Figure 2:
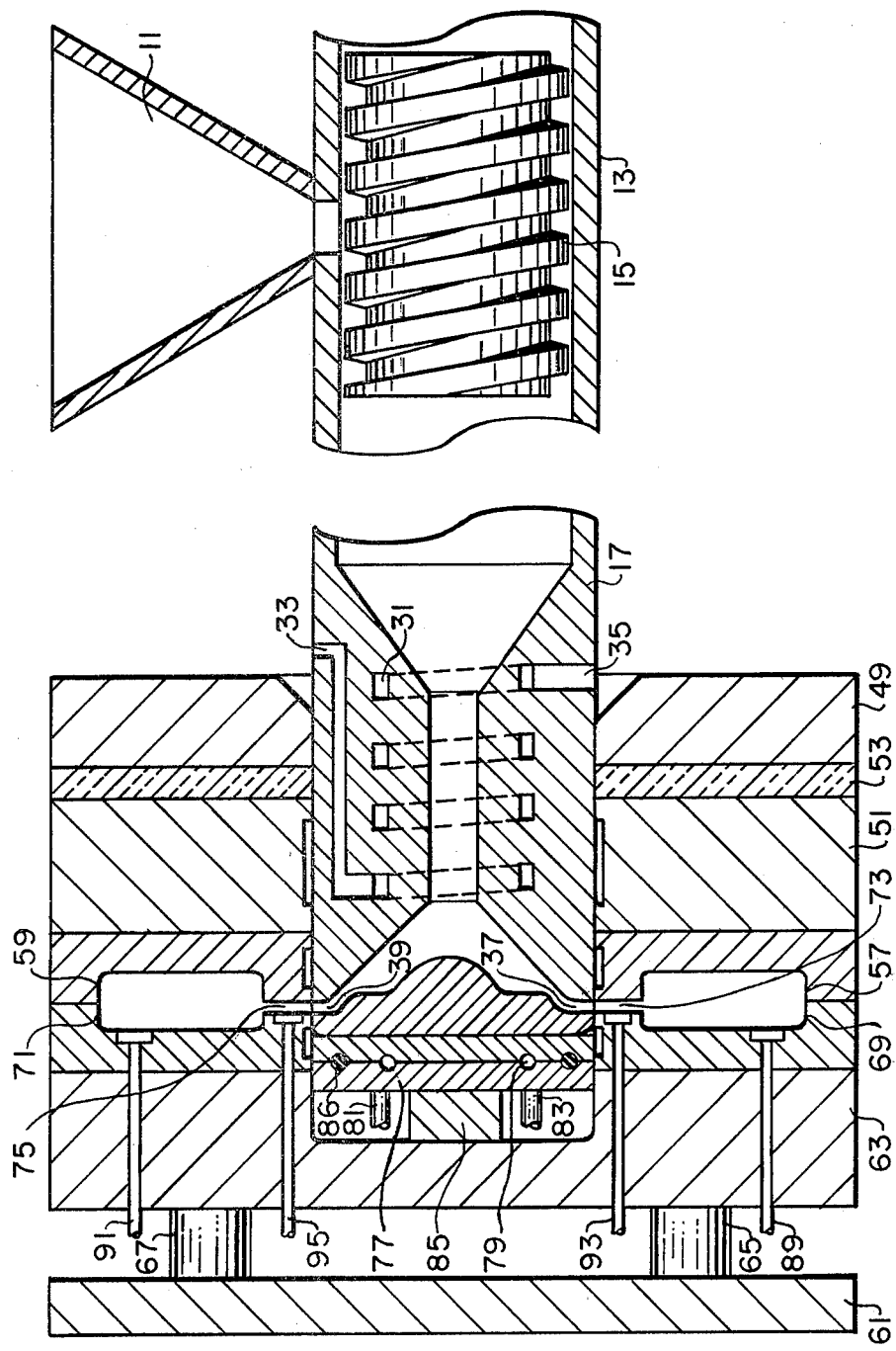
FIG. 2 is a section view, partly schematic, showing a reciprocating screw-type injection molding apparatus incorporating the present feed nozzle assembly.
Figure 3:
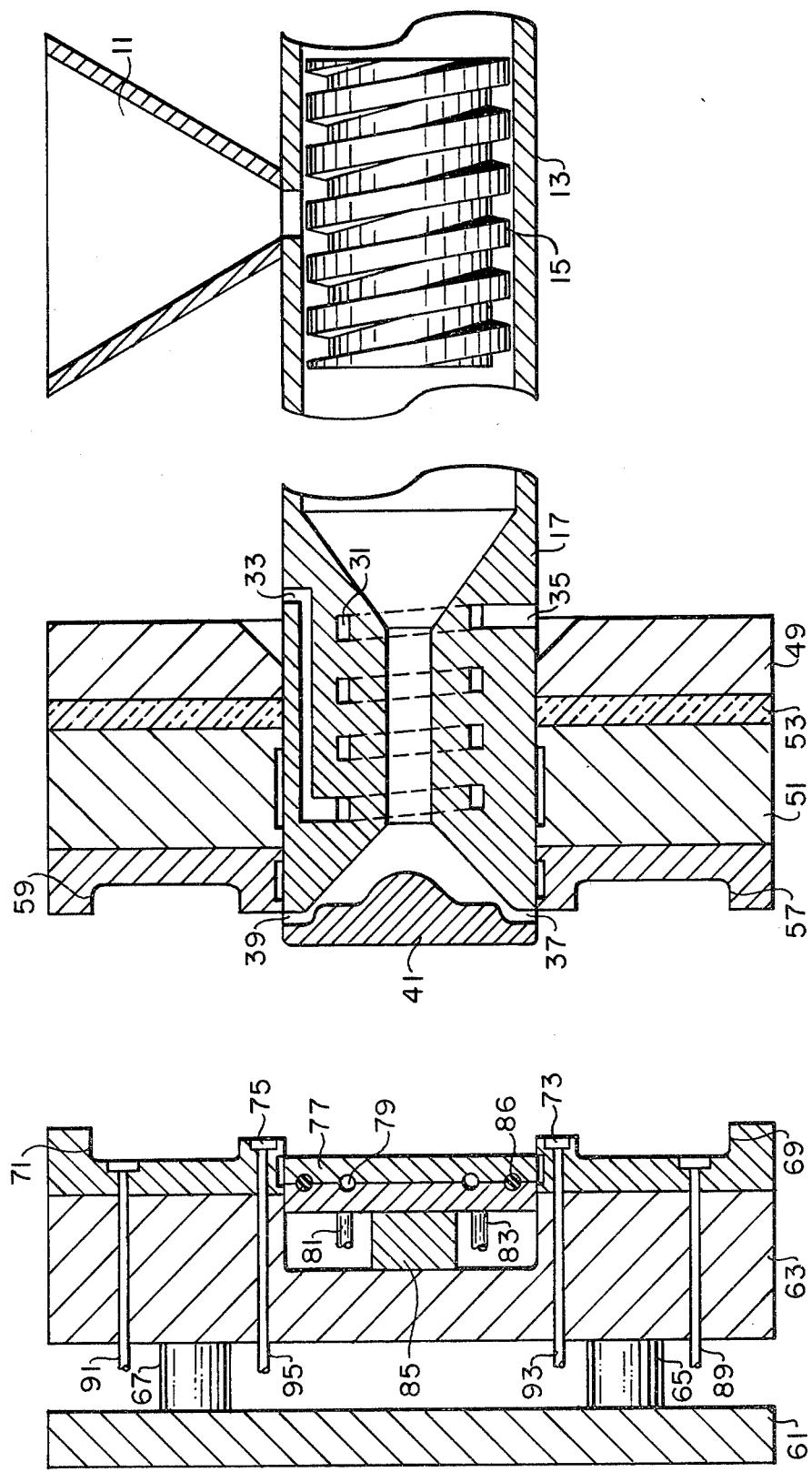
FIG. 3 shows the molding apparatus of FIG. 2 wherein the mold faces are in an open position.

Looking now at FIG. 2, thermosetting molding material is fed into hopper 11 and then into a plasticizing zone formed by the interior of heated barrel 13 and by the mechanical working of screw 15. A predetermined amount of plasticized molding material is subsequently injected by screw 15, acting as a ram, into nozzle member 17. The screw-type injection molding apparatus shown is of conventional design, except that it is adapted to receive the present nozzle assembly. As shown in FIG. 2, 3 and 5, the apparatus is of a vertical clamp type; however, it will be appreciated that the present invention may be easily adapted and is equally useful in horizontal clamping systems.

The injection molding apparatus has a stationary platen member 49. Stationary platen member 49 has heated plate 51 mounted thereon. Preferably, heated plate 51 is separated from stationary platen member 49 by a layer of insulation 53, suitably of insulating board. Heated plate 51 has a plurality of mold faces, such as 57 and 59, mounted thereon. Plate 51 may be heated by circulation of steam or heated oil therein; however, electrical heating is usually more practical and is preferred. Plate 51 is heated to maintain a temperature on the mold faces, such as 57 and 59, sufficiently high to set, or cure, the thermosetting molding material. Generally, temperatures ranging between about 135° and about 216° C. (275° to 420° F.) are maintained at the mold face, and, within this range, temperatures between about 149° and about 199° C. (300° to 390° F.) are suitable to cure a wide variety of thermosetting molding materials.

A movable platen member 61 is positioned at the end of the machine opposite stationary platen member 49. Movable platen member 61 has heat plate 63 mounted thereon and movable therewith. Movable platen member 61 is suitably separated from heat plate 63 by mounting blocks, such as 65 and 67. Heat plate 63 has a plurality of mold faces, such as 69 and 71, mounted thereon. The mold faces, such as 69 and 71, are positioned in aligned relation to corresponding mold faces, such as 57 and 59, mounted on stationary heat plate 51. Heat plate 63 may be heated by circulation of steam or hot oil therethrough; however, more practical and preferred is electrical resistance heating. Heat plate 63 supplies heat to the mold faces mounted thereon. The temperature on the mold faces is maintained sufficiently high to cure the thermosetting molding material and is similar to the temperature maintained on the stationary mold faces.

For purposes of simplicity and clarity, only two sets of mold faces, 57 and 69, and 59 and 71, are shown; however, it will be understood that the drawings contemplate a plurality of molds positioned around the nozzle member and fed therefrom.

As shown, in FIG. 2, corresponding mold faces 57 and 69 and 59 and 71 are in a closed position. Thermosetting material passes from temperature-controlled nozzle member 17, through feed outlets 37 and 39, runner channels 73 and 75, into heated mold cavities formed by heated mold faces 57 and 69 and 59 and 71.

In order to insure that thermosetting molding material is not prematurely cured within the feed system, movable heat plate 63 may be provided with an auxiliary temperature-controlled area. The auxiliary temperature-controlled area is positioned to be aligned and contiguous to the closed end of nozzle member 17 when the mold faces are in a closed position. Such an area suitably is formed by a temperature-controlled plate 77 positioned in the contact face of movable heat plate 63. Plate 77 has an internal reservoir, suitably comprised of internal connected channels 79, having an inlet 81 and an outlet 83 to circulate a liquid, e.g. water, maintained at the desired temperature. Temperature-controlled plate 77 is preferably separated from direct contact with heat plate 63 by spacers, such as 85. Plate 77 is maintained at a temperature sufficiently low that no substantial curing of the thermosetting molding material occurs and sufficiently high that the thermosetting molding material remains plasticized. Generally, temperatures between about 77° and about 121° C. (170° to 250° F.) are utilized, and, within that range, temperatures between about 99° and about 116° C. (210° to 240° F.) are aptly suited to use with a wide variety of thermosetting molding materials. Plate 77 is provided with rubber sealing gasket 86.

After the thermosetting molding material within the closed mold faces is cured, the mold faces are opened by reciprocal movement of the movable platen assembly, suitably by hydraulic means, in a direction away from the stationary platen assembly.

FIG. 3 shows the movable platen assembly retracted, moved away, from the stationary platen assembly, placing the mold faces in an open position. At this stage, the molded articles are removed from the mold faces, suitably by use of knock-out pins, such as 89 and 91, actuated by a knock-out bar, not shown. The minor amount of cured thermosetting molding material in the runner channels 73 and 75 is removed, suitably by knock-out pins, such as 93 and 95, actuated by a knock-out bar, not shown. The mold faces and surrounding areas are cleaned and made ready for the next molding step wherein the mold faces are positioned as shown in FIG. 1 and the molding process repeated.

FIG. 4 shows an alternate embodiment of the nozzle assembly wherein the assembly includes a movable sleeve member 43 positioned to fit snugly around the periphery of nozzle 17. Sleeve member 43 has a first position wherein the sleeve member is positioned over to seal off and close the feed outlets, such as 37 and 39 in the periphery of nozzle 17 to prevent drool when the mold faces are open. FIG. 4 shows the sleeve member in the first position. Sleeve member 43 has a second position wherein the sleeve member is moved toward the open end of housing 19 to expose the feed outlets and thereby allow flow therethrough. A spring member 45 is positioned about the periphery of nozzle member 17 and bears on stationary ring 46 to maintain sleeve member 43 in the first, or closed, position. Action of the mold closure, by movement of the movable platen assembly toward the stationary platen member acts on end 47 of sleeve member 43 forcing sleeve member 43 against spring member 45 to move to the second, or open, position.

FIG. 5 shows an injection molding apparatus similar to that shown in FIGS. 2 and 3, except that the apparatus has been adapted to utilize the modified nozzle assembly of FIG. 4. As shown in FIG. 5, corresponding mold faces 57 and 69, and 59 and 71, are in a closed position. Closure of the mold faces causes sleeve member 43 to be moved against the action of spring 45 to open feed outlets, such as 37 and 39 in nozzle member 17. Thermosetting molding material passes from temperature-controlled nozzle member 17 through outlets 37 and 39, runner channels 73 and 75, into heated mold cavities formed by heated mold faces 57 and 69, and 59 and 71. The stationary assembly includes retainer ring 87 positioned to limit the forward movement of sleeve member 43 when the mold faces are moved to an open position.

The apparatus components, such as the nozzle member, heat plates, platen members, cooling plate, are preferably fabricated from mold steel stable under the conditions of use.

The foregoing embodiments are intended to illustrate the invention without limiting it thereby. It will be appreciated that various modifications can be made in the invention without departing from the spirit and scope thereof.

In the above-described drawings the visible edges and exposed surfaces behind the cutting plane have been omitted in the vicinity of the mold cavities to simplify the drawings and facilitate the understanding of the apparatus of the invention.

What is claimed is:

1. An improved injection nozzle comprising:
   (a) a unitary housing member having a closed end and an open end,
   (b) said open end adapted to be attached to the injection barrel of an injection molding machine,
   (c) the interior of said closed end and the interior of said housing member forming an internal chamber,
   (d) said internal chamber narrowing along a portion thereof to form a constricted zone,
   (e) said housing member adjacent said constricted zone having operably connected means for maintaining the temperature within said constricted zone sufficiently cool to prevent any substantial curing of feed material and sufficiently warm to maintain feed material in a plasticized condition,
   (f) said housing member having a plurality of feed outlets positioned along the periphery thereof contiguous to said closed end,
   (g) said feed outlets connecting with said internal chamber; and
   (h) said housing having in combination, in contact with the closed end thereof, a temperature controlled plate that assists in controlling the temperature of the closed end of said nozzle.

2. An improved injection molding machine comprising:
   a stationary assembly comprised of:
      a stationary platen member,
      a heat plate mounted thereon, means to heat said plate, and
      a plurality of mold faces mounted on said heat plate;
   a movable assembly comprised of:
      a movable platen member,
      a heat plate mounted thereon, means for heating said plate, and
      a plurality of mold faces mounted on said heat plate corresponding to and adapted to be aligned with the mold faces on said stationary assembly to form a plurality of mold cavities;
   an injection nozzle assembly comprised of:
      a housing member having a closed end and an open end,
      said open end adapted to be attached to the injection barrel of an injection molding machine, said closed end and interior of said housing member forming an internal chamber, said internal chamber narrowing along a portion thereof to form a constricted zone, said housing member adjacent said constricted zone having operably connected means for maintaining the temperature within said constricted zone sufficiently cool to prevent any substantial curing of feed material and sufficiently warm to maintain feed material in a plasticized condition, said housing member having a plurality of feed outlets positioned along the periphery thereof contiguous to said closed end, and said feed outlets connecting with said internal chamber, means to move said movable assembly to bring said aligned mold faces into contact with corresponding mold faces in said stationary assembly to form mold cavities and runner channels adapted to feed said mold cavities, whereby said injection nozzle assembly is positioned with respect to said stationary assembly and said movable assembly such that said feed outlets are maintained in open communication with said runner channels, means for feeding a supply of plasticized thermosetting molding material into the open end of said nozzle member, through said feed outlets, then through said runner channels and into said mold cavities, and curing said thermosetting feed material enclosed within the mold cavities, and means for retracting said movable assembly to separate said mold faces and remove a molded article.

3. The apparatus of claim 2 wherein the said stationary and the said movable heat plates are heated electrically.

4. The apparatus of claim 2 having operably connected means for maintaining the mold faces at a temperature between about 149° and about 204° C.

5. The apparatus of claim 2 wherein the means for cooling said nozzle assembly comprises an internal channel within said constricted zone adapted to hold a reservoir of circulating cooling liquid.

6. The apparatus of claim 5 wherein the cooling liquid is water.

7. The apparatus of claim 5 wherein the nozzle assembly has operably connected means for maintaining a temperature with the range of between about 77° and about 121° C.

8. The apparatus of claim 2 wherein the movable assembly is provided with a temperature controlled plate that is in contact with and assists in cooling the closed end of the injection nozzle assembly when the movable assembly is in contact with the stationary assembly.

9. The apparatus of claim 2 wherein said movable heat plate has a temperature-controlled area comprised of a temperature-controlled plate member aligned with the closed end of said nozzle member, said plate having operably connected means for maintaining its temperature lower than that at which any substantial curing of the thermosetting molding material will occur but sufficiently high to maintain the molding material in a plasticized condition.

10. The apparatus of claim 9 wherein said temperature-controlled plate member has operably connected means to maintain its temperature at about 77° to about 121° C.

* * * * *